United States Patent

Coughlin et al.

[11] 4,052,793
[45] Oct. 11, 1977

[54] METHOD OF OBTAINING PROPER PROBE ALIGNMENT IN A MULTIPLE CONTACT ENVIRONMENT

[75] Inventors: Charles Paul Coughlin, Chelsea; Louis Henry Faure, Poughkeepsie, both of N.Y.

[73] Assignee: International Business Machines Corporation, Armonk, N.Y.

[21] Appl. No.: 729,537

[22] Filed: Oct. 4, 1976

[51] Int. Cl.² .................. G01B 7/00; B27G 23/00
[52] U.S. Cl. ........................ 33/180 R; 33/1 M; 33/174 TA; 33/185 R
[58] Field of Search .............. 33/1 M, 180 R, 181 R, 33/185 R, 174 TA; 116/124 R

[56] References Cited

U.S. PATENT DOCUMENTS

| 2,972,815 | 2/1961 | Weeks | 33/180 R |
|---|---|---|---|
| 3,628,497 | 12/1971 | Neu | 33/1 M |

FOREIGN PATENT DOCUMENTS

| 2,108,929 | 9/1971 | Germany | 33/1 M |
|---|---|---|---|
| 2,013,206 | 10/1970 | Germany | 33/1 M |

OTHER PUBLICATIONS

Dykstra, "Method of Making Artmasters for Circuit Boards Utilizing Land Areas Having Locating Pins", W. Electric Tech. Dig., No. 23, pp. 15-16, July, 1971.

*Primary Examiner*—Richard E. Aegerter
*Assistant Examiner*—Richard R. Stearns
*Attorney, Agent, or Firm*—William J. Dick; Wesley DeBruin

[57] ABSTRACT

Disclosed is a method of aligning a plurality of probes to a plurality of contacts, the contacts being arragned in a pattern on a substrate. The method includes the steps of powering one of a selected pattern of probes or a like pattern of selected contacts such that upon the selected patterns being in coincidence, the plurality of probes will be in contact with predetermined contacts on the substrate. This is accomplished by providing a circuit path through all of the other probes or contacts which are not powered and then bringing the plurality of probes into contact at random with the contacts of the substrate and then moving one of the substrate and probes until the selected patterns coincide as by indication of a completed circuit path between selected patterns.

6 Claims, 13 Drawing Figures

METHOD OF OBTAINING PROPER PROBE ALIGNMENT IN A MULTIPLE CONTACT ENVIRONMENT

SUMMARY OF THE INVENTION AND STATE OF THE PRIOR ART

The present invention relates to a method of aligning a plurality of probes to a plurality of contacts arranged in a pattern on a substrate, and more specifically relates to a method of aligning a plurality of very closely spaced probes and contacts to insure proper continuity or discontinuity, where appropriate, between various pads or contacts on the substrate.

In recent years the trend towards large scale integration (LSI) of various active and passive circuits on a single semiconductor chip has grown. Simultaneously, the ability to compact entire machines onto substrates which, for example, may plug directly into a chassis and comprise the entire hardware of any given or existing machine has grown. In these instances the substrate may be relatively large, ad may include multiple LSI chip sites or locations for receiving, as by the well known C4 joint or other attachment means, the semiconductor chips. The sites may be interconnected, depending upon the machine design, either through external wiring or, in the case of multi-layer ceramic substrates may be interconnected where appropriate through one or more of the layers of the multi-layer ceramic. Regardless of the composition of the substrate, i.e., whether it be ceramic, epoxy or some other form, each of the chip sites includes a plurality of contacts on the substrate which must be checked as to its electrical relationship with other chip sites for both continuity and discontinuity where appropriate. This has raised a problem in automatically checking the desired passive circuit configuration because of the dimensional problems (shrinkage and/or expansion of the substrate) in insuring proper contact of the test probes with selected ones of the contacts which are arranged in a pattern on the substrate.

In view of the above, it is a principal object of the present invention to provide a method of aligning a plurality of probes to a plurality of contacts arranged in a pattern on a substrate.

Still another object of the present invention is to provide a method of aligning a plurality of probes to a plurality of contacts without the use of extensive time consuming optical measurements and data manipulation and storage.

Yet another object of the present invention is to provide a non-optical method of measuring and recording the location of conductive features of substrates, P.C. boards, modules etc.

Other objects and a more complete understanding of the invention may be had by referring to the following specification and claims taken in conjunction with the accompanying drawings in which:

FIG. 5A shows the proper relationship of the probes relative to certain contacts on the substrate while

Figure 1:
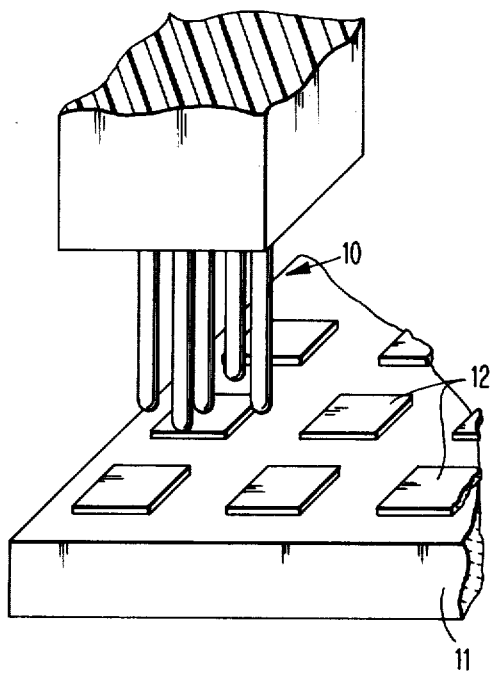
FIG. 1 is a fragmentary perspective view illustrating the principal of one aspect of the invention.
Figures 2A, 2B, 2C:
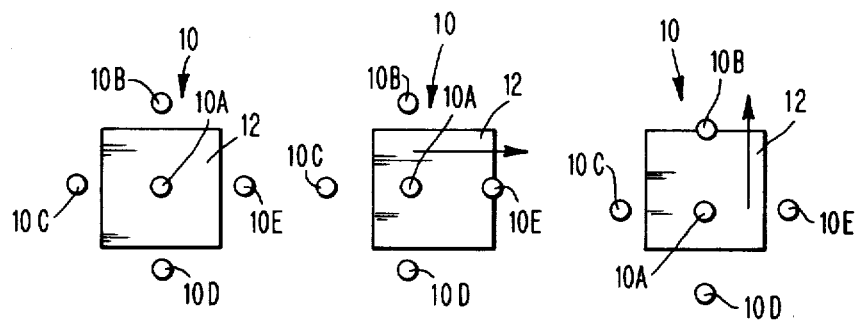
FIGS. 2A-2C illustrate schematically the position of the test probes in an ideal alignment with respect to a contact and how such ideal centering is accomplished.
Figure 3:
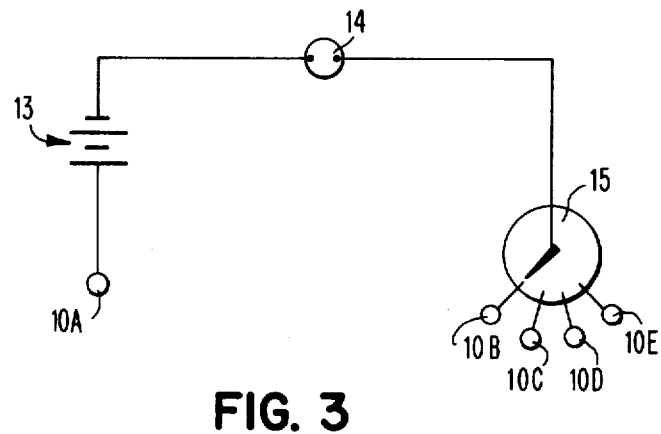
FIG. 3 is a simple schematic diagram illustrating an example circuit for obtaining the correct alignment of the probes to the pad such as illustrated in FIG. 2A.

Referring now to the drawings, and especially FIGS. 1-3 thereof, the principle of operation of the present invention is illustrated therein. As best illustrated in FIG. 1, a plurality of probes 10 arranged in a cluster are positioned superimposed of a substrate 11 on which are placed a plurality of contacts 12 which are arranged in a pattern on the substrate. The substrate may include a plurality of layers (not shown) of insulator like material such as a ceramic and include conductive patterns, via hole conductors, ground planes and the like therein with at least some terminations on the opposite side or major surface of the substrate. To illustrate the principle of operation of the present invention, a single contact (in the illustrated instance a pad like contact) is shown with a plurality of probes superimposed of the pad, and as shown in FIG. 2A in their desired position. The probes have been designated 10A-10E, each of the probes of the cluster illustrated in FIG. 2A being spaced from at least its adjacent probe a distance less than the width of the contact 12 which is to be contacted but greater than one half the width of the contact. Thus the relationship of contacts 10B-10E to contact 10A is that they are a distance less than the width of the contact away from probe 10A but are greater in distance than one half the width of that contact.

The operation of the centering of the probe cluster such as illustrated in FIG. 2A becomes evident from a study of the circuit diagram of FIG. 3. As shown in FIG. 3 the center probe 10A is provided with a source of power, in the illustrated instance a battery 13 which is connected in series through an ammeter 14 to a rotary switch 15. Assuming the condition of the contact relative to the substrate shown in FIG. 2B, rotation of the switch would indicate an open at 10B, 10C and 10D but a shorted condition at 10E (the circuit is closed when contact 12 mates or registers with probes 10A and 10E). This would indicate to the operator that the position of the probes relative to the substrate must be moved in the direction of the arrow until a non-shorted condition exists between the central probe 10A and any of the remaining probes 10B-10E. A second situation is indicated in FIG. 2C wherein rotation of the switch will indicate a shorted condition exists between 10A and 10B and a non-shorted condition exists between 10C-10E. This indicates that the probes should be moved in the direction of the arrow or that relative movement should occur in the direction of the arrow so that the probes assume a position such as illustrated in FIG. 2A. It should be noted that either the contact 12 or the central probe 10A may be provided with a source of power so that a shorting condition can be obtained between one or more of the probes, specifically central probe 10A and any of the peripherally surrounding probes of the cluster.

Figure 4:
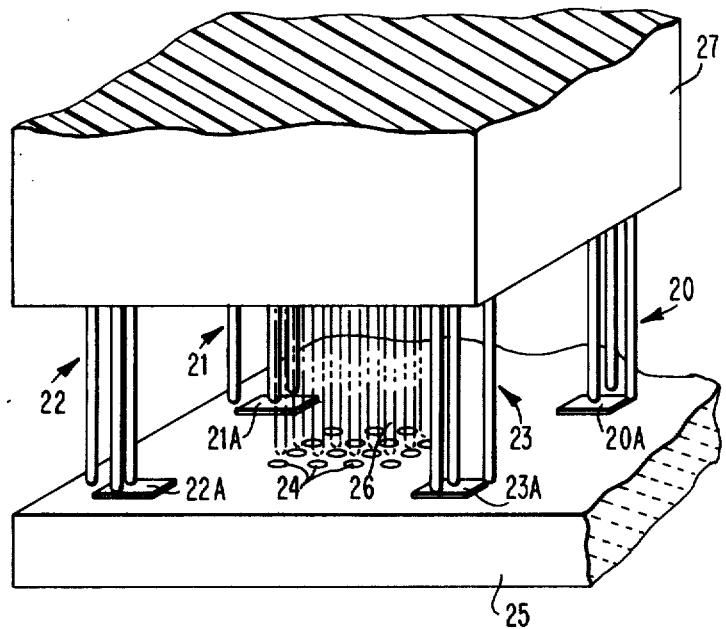
FIG. 4 is a fragmentary perspective view of the relationship of a typical probe assembly relative to contacts which are to be probed on a substrate.
Figure 5A:
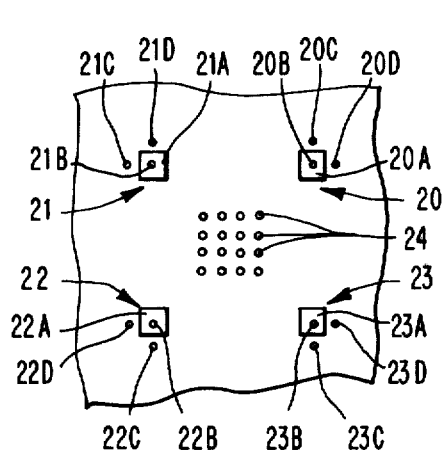
Figure 5B:
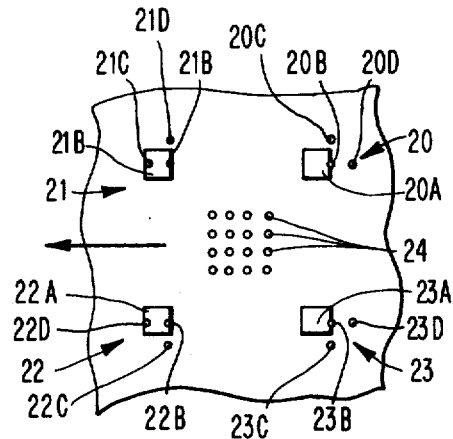
FIG. 5B illustrates an incorrect relationship which indicates that the probes must be moved in the direction of the arrow for correct alignment of the contacts to the probes.
Figure 6:
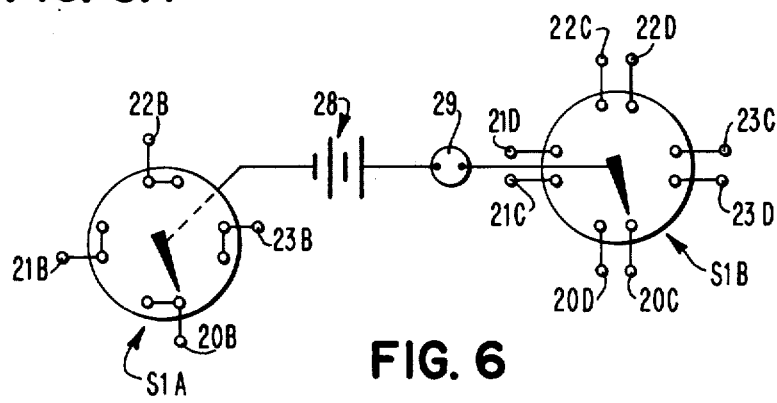
FIG. 6 is a schematic diagram of a simple electrical circuit which may be employed to indicate the position of the probes relative to the contacts on the substrate to facilitate correct operator movement of the probes to achieve correct alignment.

A more practical embodiment of the invention is illustrated in FIGS. 4–6 wherein a plurality of probe clusters 20, 21, 22 and 23 are positioned to contact engineering change pads 20A–23A respectively which box in a plurality of contacts 24 located on a substrate 25 similar to that which has heretofore been described. The purpose of the probe clusters 20–23 is to accurately align the probes 26 with the contacts 24 on the substrate 25. The probe clusters 20–23 as well as the probes 26 depend from a probe terminal block 27 which are connected to suitable instrumentation, while the substrate 25 or the probes themselves may be connected to an X-Y table to effect relative movement between the probes and the substrate. Additionally, the probes should be capable of elevation so that upon movement in the X-Y mode of one of the probe terminal block 27 or the substrate 25, scrubbing action will not occur.

When the probes of the clusters 20–23 are in the position illustrated in FIG. 5A, the probes 26 will align with the contacts 24. As illustrated best in FIGS. 5A and 5B, the probes of each of the clusters 20–23 have been suitably designated with capital letters for purposes of the following description. By powering either the contact 20A–23A or the central probes 20B–23B, alignment of the probes 26 will be insured very much as heretofore described relative to FIGS. 1–3. A simple schematic for accomplishing the alignment is illustrated in FIG. 6 wherein a ganged wafer switch S1A S1B is shown with its center contact in series through a battery 28 and an ammeter 29, the contacts of switch S1A, in the illustrated instance, being powered (i.e., the center conductor 20B–23B) while the contacts of S1B being connected respectively to the perimeter probes of the clusters 20–23. Thus an examination of FIG. 6 in conjunction with FIG. 5B will illustrate that a shorted condition exists between contacts 21B and 21c, and a shorted condition exists between contacts 22B and 22D indicating to the operator, merely be rotation by the switch, that the probes must be moved relative to the substrate 25 in the directon of the arrow shown in FIG. 5B. In this manner the probes may be brought into alignment not only with the engineering change contacts 20A–23A but the probes 26 are brought into alignment with the contacts 24 for suitable checking operations.

Figure 7:
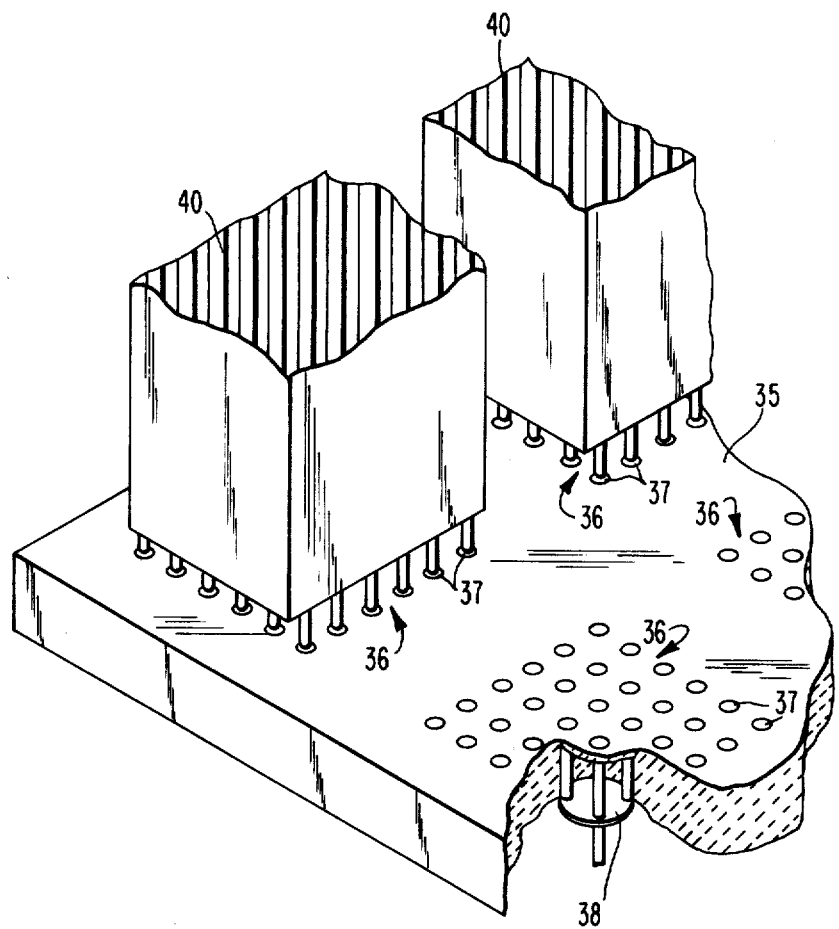
FIG. 7 is a enlarged fragmentary perspective view of typical probes in place on multiple contact pattern substrate.
Figure 8A:
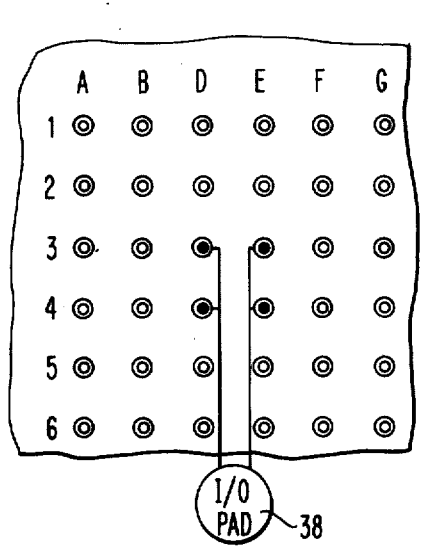
FIGS. 8A and 8B illustrate the correct relationship and incorrect relationship respectively of the probes to contacts.

FIG. 7 illustrates a more realistic fragment of a multilayer ceramic substrate 35 having a plurality of chip sites 36 thereon, each chip site comprising a plurality of contacts 37 which are adapted to mate with like locations on a semiconductor chip. The substrate 35 may include contact pads or I/O pins or the like on the other side of the substrate such as shown at 38 in FIG. 7, and will, as is conventional practice, include layers of wiring intermediate the layers of ceramic. As shown best in FIG. 7, certain of the patterns of contacts are shown in registry with probe clusters 40. The proper orientation and position of the probes relative to the contacts is illustrated in FIG. 8A. To aid in identification, the rows of both contacts and probes are designated 1–6, while the columns are designated A, B, D, E, F and G. To distinguish between probe numbers and contact numbers the letter "C" is used as a prefix to the column and row designation and the letter "P" will be used as a prefix for the probes. Thus for example probe PD2 should register with contact CD2.

Figure 9:
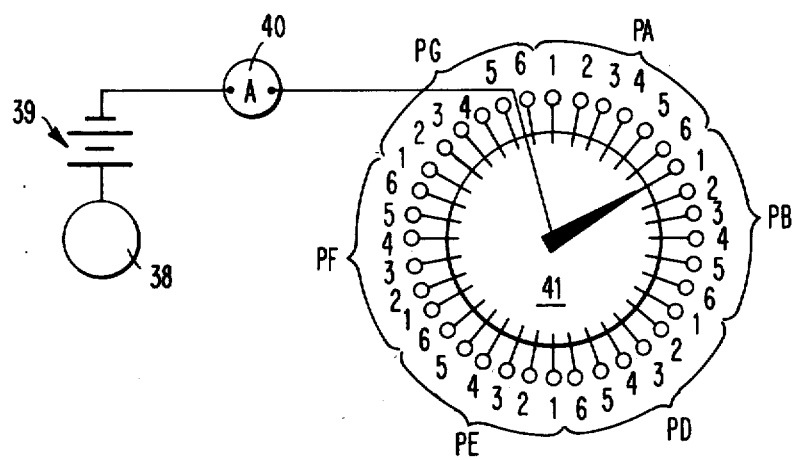
FIG. 9 is a simple schematic diagram illustrating an electrical circuit to permit the proper alignment of the probes relative to the substrate.

In accordance with the invention, one of a selected pattern of probes or a like pattern of selected contacts is powered such that upon the selected patterns being in coincidences, the plurality of probes 40 will be in contact with predetermined contacts 37 on the substrate. This is accomplished by providing a circuit path through all of the other probes or contacts which are not so powered, bringing the plurality of probes into contact at ramdom with the contacts of the substrate, and then moving one of the substrates and probes until the selected patterns coincide as by an indication of a completed circuit path between the selected patterns. In the illustrated instance it is easier to power a pattern of selected contacts. As shown in FIG. 8A, contacts CD3, CE3, CD4 and CE4. The contacts of the pattern may be powered as by I/O pad 38 while a circuit path is provided through the other of the probes or contacts which are not so powered, in the present instance all of the other probes. As may be seen in FIG. 9, the circuit for simple identification of the powering of the contacts and determining where the probes are relative to the selected pattern is similar to the circuit diagrams illustrated in FIGS. 3 and 6 except here I/O pad 38 is in series with a battery 39, an ammeter 40 and a switch 41 (since there are 36 probes and contacts in the illustrated instance). In this manner, when probes PD3, PE3, PD4 and PE4 are in contact with contacts CD3, CE3, CD4 and CE4 respectively, the remaining probes will be in contact with the remaining contacts.

Figure 8B:
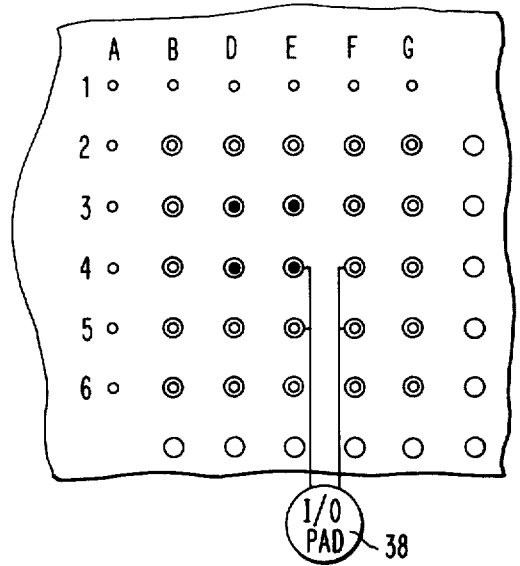

As an example, and referring now to FIG. 8B, when the probes are positioned approximately superimposed of the contacts, such as illustrated in FIG. 8B, the only switch position which will indicate continuity will be switch position PD3. This will indicate to the operator that he must move in a search pattern and a simple stepping motion both horizontally and vertically will be undertaken until the contacts of the selected pattern are in registry with the selected pattern of probes.

It should be recognized that the system and method proposed may be fine tuned. It is obvious that the selected patterns of probes and contacts, while being in registry, may not be centered with respect to each other even though continuity coincidence may be indicated. In this connection, once registration has been obtained, the probes or substrate may be moved in very small incremental steps, while counting the steps, until continuity is lost. Then the substrate or probes may be moved in the opposite direction until continuity is once again lost, and thereafter the count split and the probe or substrate move back to the center position.

Thus the present invention provides a simple and yet effective method for an operator to determine the exact position of the probes relative to multiple contacts on a substrate. It should be recognized that the switching arrangements shown are only exemplary and a standard computer circuit pattern may be employed to very rapidly check out continuity and determine, with a simple program the movement of either the substrate or the probes until coincidence of the selected patterns coincide.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. A method of aligning a plurality of probes to a plurality of contacts arranged in a pattern on a substrate, said method comprising the steps of:

powering one of a selected pattern of probes or a like pattern of selected contacts such that upon the selected patterns being in coincidence, the plurality of probes will be in contact with predetermined contacts on the substrate;

providing a circuit path through one of all of the other probes or contacts not so powered, bringing said plurality of probes into contact at random with said contacts of said substrate, and moving one of said substrate and probes until said selected patterns coincide as indicated by a completed circuit path between said selected patterns.

2. A method of aligning a plurality of probes to a plurality of contacts in accordance with claim 1 wherein the selected pattern of contacts are powered and wherein a circuit path is provided through all of the probes, and including the step of separating the probes in spaced apart relation relative to the substrate during relative movement between said probes and contacts.

3. A method of aligning a plurality of probes to a plurality of contacts arranged in a pattern on a substrate, said method comprising the steps of:

powering a selected pattern of probes, and providing a circuit path through at least a like pattern of contacts so that upon registration of the patterns, the plurality of probes will align with the plurality of contacts, bringing said plurality of probes into contact at random with said contacts of said substrate, and moving one of said substrate and probes until said selected patterns coincide as indicated by a completed circuit path between said selected patterns.

4. A method in accordance with claim 3 including the step of providing a circuit path through all of the contacts.

5. A method of aligning a tool to a plurality of electrically conductive contacts on a substrate, said method comprising the step of;

positioning a tool approximately in the area of said contacts on a substrate;

providing at least a pair of probe clusters fixed with respects to said tool, each being associated with a contact on said substrate and having a plurality of spaced apart probes, each of said probes of a cluster being spaced from at least its adjacent probe a distance less than the width of the associated contact which is to be contacted but greater than one half the width of said contact;

providing a source of electrical power to one of a selected probe of each of said pair of probe clusters or to their associated contacts, contacting said associated contacts with said selected probes, sensing whether a shorted condition exists between said selected probe and any other probe of a cluster and moving one of said tool and substrate until a non-shorting condition exists between the selected probe of each probe cluster and the associated contact, thereby indicating that said tool is aligned with said substrate.

6. A method of aligning a plurality of probes to a plurality of electrically conductive contacts on a substrate, said contacts on the substrate including pad like contacts adjacent to the contacts on the substrate, said method comprising the steps of:

positioning said plurality of probes approximately in the area of said contacts on said substrate;

providing at least a pair of probe clusters each being associated with a contact on said substrate and having a plurality of spaced apart probes, each of said probes of a cluster being spaced from at least its adjacent probe a distance less than the width of the associated pad like contact which is to be contacted but greater than one half the width of said pad like contact, providing a source of electrical power to a selected probe of each of said pair of probe clusters, contacting said associated pad like contacts with the associated selected probes, sensing whether a shorted condition exists between said selected probe and any other probe of a cluster, and moving one of said plurality of probes and substrate until a non-shorting condition exists between the selected probe of each cluster and the associated contact thereby indicating that said plurality of probes is aligned with said substrate.

* * * * *